(12) United States Patent
Baek et al.

(10) Patent No.: US 11,422,396 B2
(45) Date of Patent: Aug. 23, 2022

(54) DISPLAY DEVICE

(71) Applicant: LG ELECTRONICS INC., Seoul (KR)

(72) Inventors: Sangmin Baek, Seoul (KR); Juyoung Joung, Seoul (KR); Hyuncheol Cho, Seoul (KR); Seungse Kim, Seoul (KR); Minho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/214,006

(22) Filed: Mar. 26, 2021

(65) Prior Publication Data
US 2022/0066256 A1 Mar. 3, 2022

(30) Foreign Application Priority Data
Aug. 25, 2020 (KR) .......... 10-2020-0107011

(51) Int. Cl.
*G02F 1/1333* (2006.01)
*G02F 1/13357* (2006.01)
(Continued)

(52) U.S. Cl.
CPC ..... *G02F 1/133308* (2013.01); *G02B 6/0088* (2013.01); *G02F 1/13452* (2013.01); *G02F 1/133608* (2013.01); *G02F 1/133331* (2021.01)

(58) Field of Classification Search
CPC .......... G02F 1/133308; G02F 1/13332; G02F 1/133331
See application file for complete search history.

(56) References Cited

U.S. PATENT DOCUMENTS

| 2015/0146390 A1* | 5/2015 | Park | G02F 1/133528 |
| | | | 361/752 |
| 2015/0373865 A1* | 12/2015 | Byeon | H05K 5/0217 |
| | | | 361/679.01 |
| 2019/0094600 A1* | 3/2019 | Cho | G02F 1/133308 |

FOREIGN PATENT DOCUMENTS

| EP | 2639632 | 9/2013 |
| KR | 10-2005-0054543 | 6/2005 |

(Continued)

OTHER PUBLICATIONS

Korean Intellectual Property Office Application No. 10-2020-0107011, Office Action dated Sep. 23, 2021, 6 pages.
(Continued)

*Primary Examiner* — Mariceli Santiago
(74) *Attorney, Agent, or Firm* — Lee, Hong, Degerman, Kang & Waimey PC

(57) ABSTRACT

A display device is disclosed. The display device includes: a display panel; a frame disposed at a rear of the display panel; a light source disposed between the display panel and the frame, and configured to provide light to the display panel; a guide panel disposed adjacent to an edge of the display panel and coupled to the frame, and configured to support the display panel; and a front sheet including a light transmitting portion covering a front surface of the display panel, and a light shielding portion extending from the light transmitting portion and covering the guide panel, wherein the guide panel includes: an inner part disposed between the frame and the display panel and configured to support a rear surface of the display panel adjacent to the edge of the display panel; and an outer part disposed toward an outer side of the frame and configured to cover a side surface of the edge of the display panel.

13 Claims, 20 Drawing Sheets

(51) Int. Cl.
*G02F 1/1345* (2006.01)
*F21V 8/00* (2006.01)

(56) References Cited

FOREIGN PATENT DOCUMENTS

| KR | 10-2008-0047023 | 5/2008 |
| KR | 10-2015-0145151 | 12/2015 |
| KR | 10-2020-0047604 | 5/2020 |

OTHER PUBLICATIONS

PCT International Application No. PCT/KR2021/003154, International Search Report dated Oct. 7, 2021, 4 pages.

* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2020-0107011, filed on Aug. 25, 2020, the contents of which are hereby incorporated by reference herein in its entirety.

BACKGROUND OF THE INVENTION

1. Field of the Invention

The present disclosure relates to a display device.

2. Description of the Related Art

With the development of information society, there are increasing demands for various types of display devices. In order to meet such demands, various display devices have been developed and used, including a Liquid Crystal Display (LCD), an Electro luminescent Display (ELD), a Vacuum Fluorescent Display (VFD), an Organic Light Emitting Diode (OLED), and the like.

Among these devices, the liquid crystal display panel of the LCD device includes a liquid crystal layer, and a thin film transistor (TFT) substrate and a color filter substrate being positioned to face each other with the liquid crystal layer being interposed therebetween. The liquid crystal display panel displays an image by using light provided by a backlight unit of the liquid crystal display.

Recently, as the display devices provide images with a higher quality, many studies are conducted on the structure of the display devices.

SUMMARY OF THE INVENTION

It is an object of the present disclosure to solve the above and other problems.

It is another object of the present disclosure to provide a display device with improved optical characteristics.

It is yet another object of the present disclosure to provide a display device having structural reliability.

In accordance with an aspect of the present disclosure, the above and other objects can be accomplished by providing a display device, including: a display panel; a frame disposed at a rear of the display panel; a light source disposed between the display panel and the frame, and configured to provide light to the display panel; a guide panel disposed adjacent to an edge of the display panel and coupled to the frame, and configured to support the display panel; and a front sheet including a light transmitting portion covering a front surface of the display panel, and a light shielding portion extending from the light transmitting portion and covering the guide panel, wherein the guide panel includes: an inner part disposed between the frame and the display panel and configured to support a rear surface of the display panel adjacent to the edge of the display panel; and an outer part disposed toward an outer side of the frame and configured to cover a side surface of the edge of the display panel.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
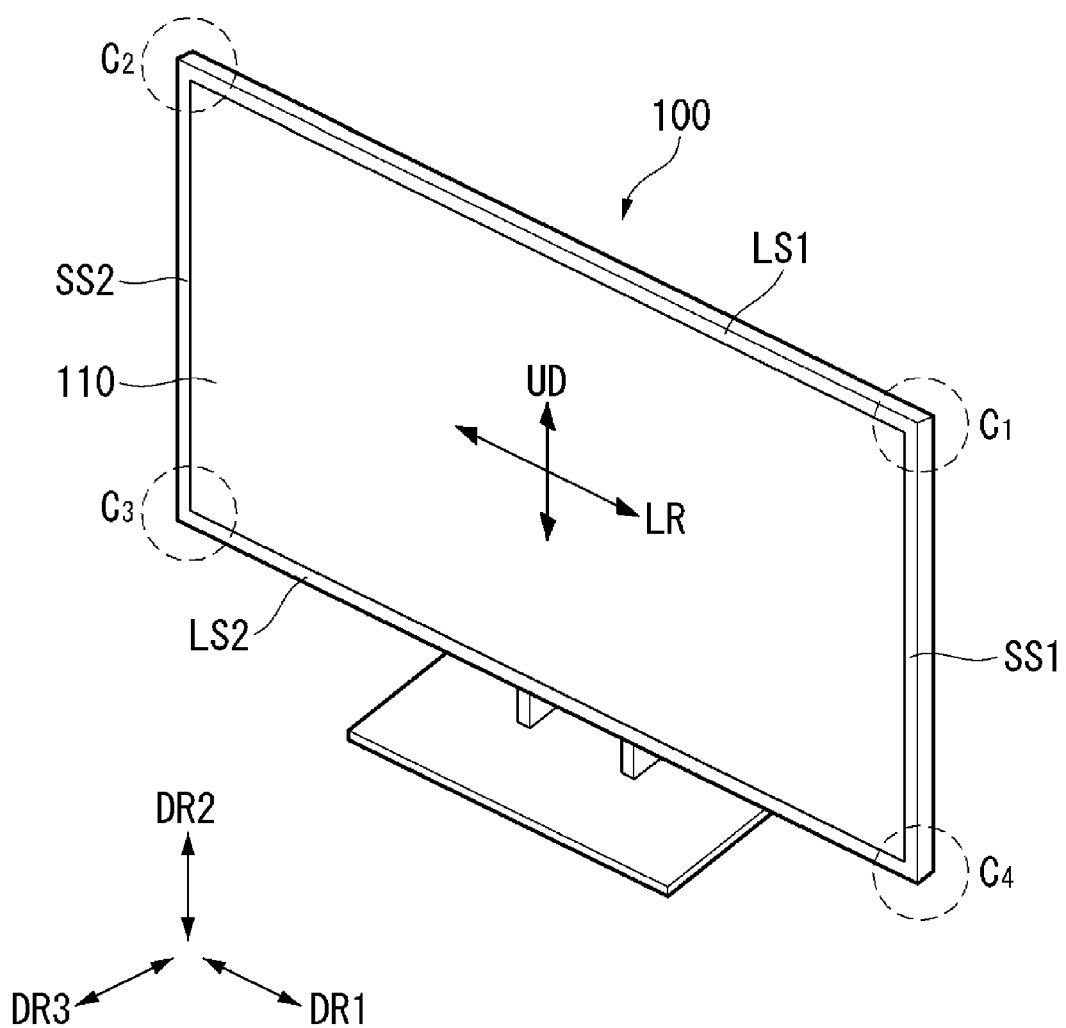
FIGS. 1 to 6 are diagrams illustrating examples of a display device related to the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components, and a redundant description thereof will be omitted.

Terms "module" and "part" for elements used in the following description are given simply in view of the ease of the description, and do not carry any important meaning or role. Therefore, the "module" and the "part" may be used interchangeably. Descriptions of some well-known technologies that possibly obscure the disclosure will be omitted, if necessary. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, a display panel will be described using a Liquid Crystal Display (LCD) device as an example, but the display panel which may be applied to the present disclosure is not limited to the LCD panel, and a Field Emission Display (FED) and an Organic Light Emitting Diode (OLED) may also be applied.

Further, in the following description, a display device 100 may include a first long side LS1; a second long side LS2 opposite the first long side LS1; a first short side SS1 adjacent to the first long side LS1 and the second long side LS2; and a second short side SS2 opposite to the first short side SS1.

Here, an area of the first short side SS1 may be referred to as a first side area, and an area of the second short side SS2 may be referred to as a second side area opposite the first side area. In the display device 100, an area of the first long side LS1 may be referred to as a third side area adjacent to the first side area and the second side area, and disposed between the first side area and the second side area; and an area of the second long side LS2 may be referred to as a fourth side area adjacent to the first side area and the second side area, disposed between the first side area and the second side area, and opposite the third side area.

For convenience of explanation, FIG. 1 illustrates an example in which the length of the first and second long sides LS1 and LS2 is greater than the length of the first and second short sides SS1 and SS2, but the length of the first and second long sides LS1 and LS2 may be approximately equal to the length of the first and second short sides SS1 and SS2.

In the following description, a first direction DR1 is a direction parallel to the first and second long sides LS1 and LS2 of a display panel 110, and a second direction DR2 is a direction parallel to the first and second short sides SS1 and SS2 of the display panel 110. A third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side or a surface, on which the display device 100 displays an image, may be referred to as a front side or a front surface. When the display device 100 displays the image, a side or a surface, at which the image may not be viewed, may be referred to as a back side or a back surface. When the display device 100 is viewed from the front side or the front surface, the first long side LS1 may be referred to as an upper side or an upper surface, and the second long side LS2 may be referred to as a lower side or a lower surface. When the display device 100 is viewed from the front side or the front surface, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device 100. Further, positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an up and down direction UD.

Figure 2:
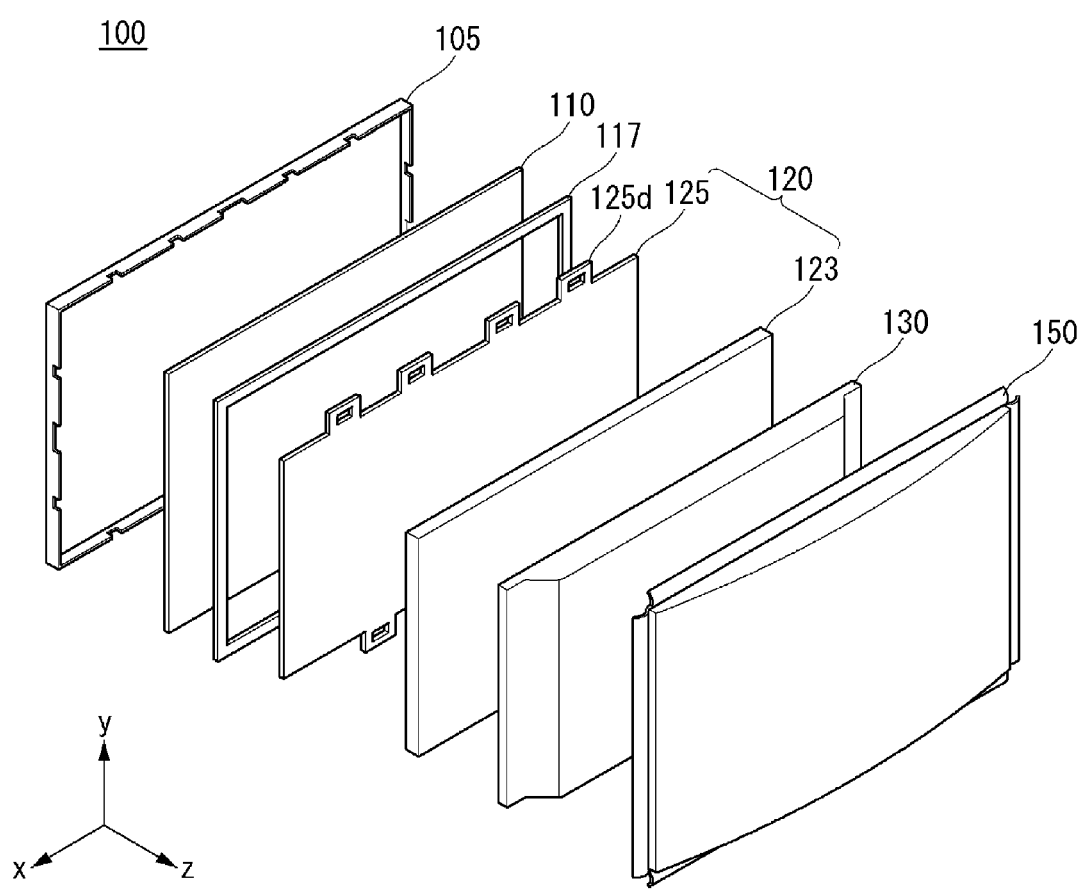

Referring to FIGS. 1 and 2, a display panel 110 may be provided on the front side of the display device 100 and may display images. The display panel 110 may include a plurality of pixels and may output an image in accordance with color, brightness, and chroma of each pixel.

The display panel 110 may be divided into an active area, in which an image is displayed, and an inactive area in which no image is displayed. The display panel 110 may include a front substrate and a rear substrate which are disposed opposite each other with a liquid crystal layer disposed therebetween.

The front substrate may include a plurality of pixels, each including red (R), green (G), and blue (B) subpixels, and may generate a red, green, or blue image according to a control signal.

The rear substrate may include switching elements. The rear substrate may switch pixel electrodes. For example, the pixel electrode may change a molecular arrangement of a liquid crystal layer according to a control signal applied from the outside. The liquid crystal layer may include a plurality of liquid crystal molecules. The arrangement of the liquid crystal molecules may be changed in response to a difference in voltage applied between the pixel electrode and the common electrode. The liquid crystal layer may transfer light, provided from a backlight unit 120, to the front surface.

The front cover 105 may cover at least a portion of the front surface or a side surface of the display panel 110. The front cover 105 may be formed in the shape of a square frame with a hollow center.

The front cover 105 may be divided into a front cover and a side cover, i.e., indicating that the front cover 105 may be divided into the front cover, disposed on the front surface of the display panel 110, and the side cover disposed on the side surface of the display panel 110. The front cover and the side cover may be provided separately. Either the front cover or the side cover may be omitted. For example, for aesthetic design purposes and the like, there may be cases in which only the side cover is provided without the front cover.

A guide panel 117 may be disposed at the back of the display panel 110. The guide panel 117 may support a portion of the back surface of the display panel 110. The guide panel 117 may come into contact with the periphery of the display panel 110. The guide panel 117 may be connected to the frame 130.

A backlight unit 120 may be disposed at the back of the display panel 110. The backlight source 120 may include a plurality of light sources. The backlight unit 120 may be of a direct type or an edge type. The edge-type backlight unit 120 may further include a light guide unit or a light guide panel (LGP).

The backlight unit 120 may be disposed on the front surface of the frame 130. For example, the plurality of light sources may be disposed on the front surface of the frame 130, which may be collectively referred to as a direct-type backlight unit.

The backlight unit 120 may be driven by a full driving scheme or a partial driving scheme such as local dimming, impulsive, and the like. The backlight unit 120 may include an optical sheet 125 and an optical layer 123.

The optical sheet 125 may diffuse light from the light sources. The optical sheet 125 may be composed of a plurality of layers. For example, the optical sheet 125 may include at least one prism sheet and/or at least one diffusion sheet.

The optical sheet 125 may include at least one coupling portion 125d. The coupling portion 125d may be coupled to the front cover 105, the frame 130, and/or the back cover 150. That is, the coupling portion 125d may be coupled directly to the front cover 105, the frame 130, and/or the back cover 150. Unlike this embodiment, the coupling portion 125d may be coupled to a structure connected to the front cover 105, the frame 130, and/or the back cover 150. That is, the coupling portion 125d may be coupled indirectly to the front cover 105, the frame 130, and/or the back cover 150.

The optical layer 123 may include light sources and the like. The optical layer 123 will be specifically described in the relevant portion.

The frame 130 may support the components of the display device 100. For example, the backlight unit 120 and the like may be connected to the frame 130. The frame 130 may be made of a metal material, such as an aluminum alloy and the like.

The back cover 150 may be disposed at the back of the display device 100. The back cover 150 may protect internal components from external environments. At least a portion of the back cover 150 may be connected to the frame 130 and/or the front cover 105. The back cover 150 may be molded with a resin material.

Figure 3:
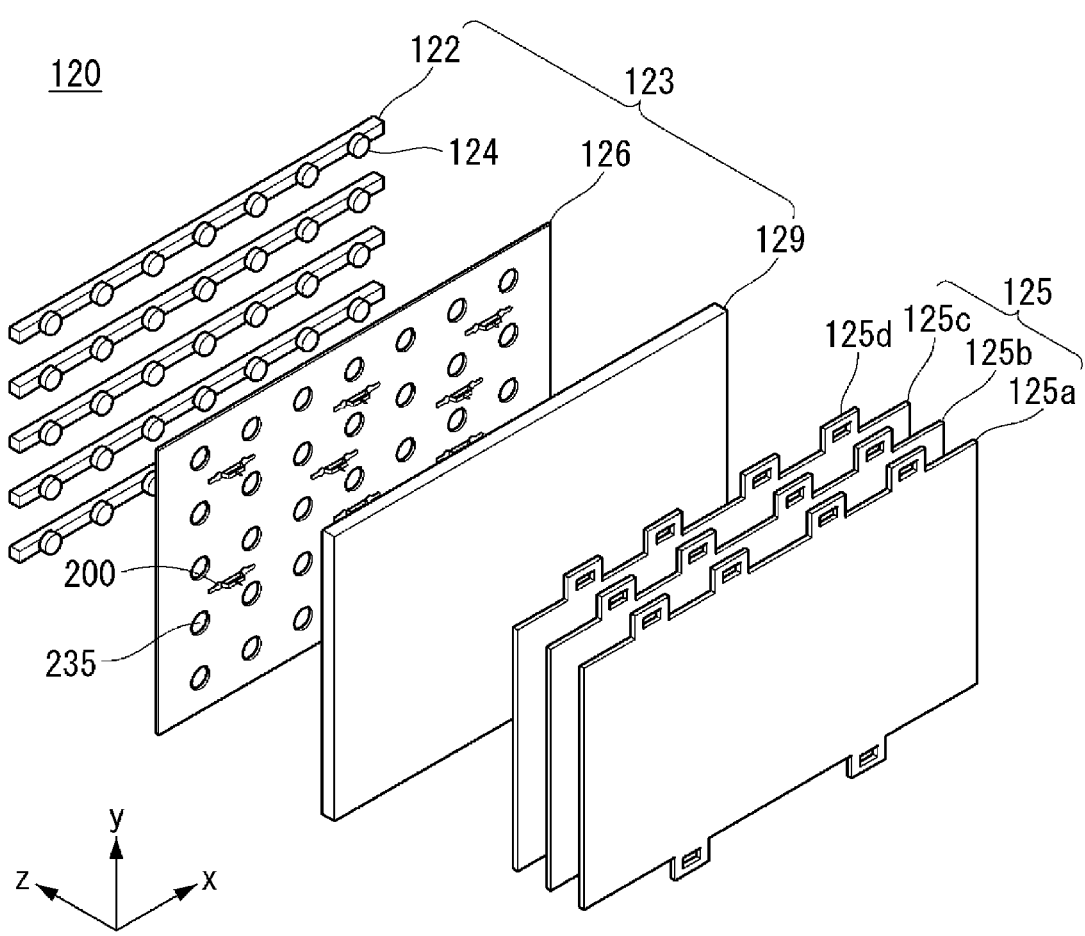

Referring to FIG. 3, the backlight unit 120 may include: the optical layer 123 having a substrate 122, at least one optical assembly 124, a reflective sheet 126, and a diffusion plate 129; and the optical sheet 125 disposed in front of the optical layer 123. The components of the backlight unit 120 are not limited thereto, and any one or more of them may be omitted.

The substrate 122 may be formed with a plurality of straps extending in a first direction and being spaced apart from each other in the second direction intersecting the first direction.

At least one optical assembly 124 may be mounted on the substrate 122. An electrode pattern for connecting an adaptor and the optical assembly 124 may be formed on the substrate 122. For example, a carbon nano tube (CNT) electrode pattern may be formed as the electrode pattern on the substrate 122.

The substrate 122 may be made of at least one of polyethylene terephthalate (PET), glass, polycarbonate (PC), and silicon. The substrate 122 may be a printed circuit board (PCB).

The optical assemblies 124 may be disposed on the substrate 122 at predetermined intervals in a first direction. A diameter of the optical assemblies 124 may be greater than a width of the substrate 122. That is, the diameter of the optical assemblies 124 may be greater than the length of the substrate 122 in the second direction.

The optical assembly 124 may be a light emitting diode (LED) chip or an LED package including at least one LED chip.

The optical assembly 124 may be configured as a white LED or a colored LED emitting light of at least one of red, blue, and green. The colored LED may include at least one of a red LED, a blue LED, and a green LED.

A light source included in the optical assembly 124 may be of a chip-on-board (COB) type. The COB type may be a type formed by directly coupling an LED chip, which is a light source, to the substrate 122, such that a manufacturing process may be simplified. Also, resistance may be reduced, thereby reducing energy lost to heat. That is, power efficiency of the optical assembly 124 may be enhanced. The COB type may provide brighter lighting. The COB type may be made thinner and lighter than the related art.

The reflective sheet 126 may be disposed on a front surface of the substrate 122. The reflective sheet 126 may have through holes 235, and the optical assemblies 124 may be inserted into the through holes 235.

The reflective sheet 126 may reflect forward light provided from the optical assembly 124. Further, the reflective sheet 126 may reflect light, reflected from the diffusion plate 129, toward the diffusion plate 129 again.

The reflective sheet 126 may contain at least one of a metal and a metal oxide as reflective materials. For example, the reflective sheet 126 may include a metal and/or a metal oxide having high reflectivity, such as at least one of aluminum (Al), silver (Ag), gold (Au), and titanium dioxide (TiO2).

The reflective sheet 126 may be formed by depositing and/or coating a metal or a metal oxide on the substrate 122. Ink containing a metal may be printed on the reflective sheet 126. The reflective sheet 126 may include a deposition layer formed using a vacuum deposition method such as thermal deposition, evaporation, or sputtering. The reflective sheet 126 may have a coated layer and/or a printed layer formed by printing, gravure coating, or silk-screening.

An air gap may be positioned between the reflective sheet 126 and the diffusion plate 129. The air gap may serve to cause light emitted from the optical assembly 124 to be widely spread. In order to maintain the air gap, a supporter 200 may be disposed between the reflective sheet 126 and the diffusion plate 129. The air gap may be referred to as an optical gap.

A resin may be deposited on the optical assembly 124 and/or the reflective sheet 126. The resin may serve to spread light emitted from the optical assembly 124. The diffusion plate 129 may diffuse upward light emitted from the optical assembly 124.

The optical sheet 125 may be disposed in front of the diffusion plate 129. A rear surface of the optical sheet 125 may face the diffusion plate 129, and a front surface of the optical sheet 125 may face the rear surface of the display panel 110.

The optical sheet 125 may include at least one or more sheets. Specifically, the optical sheet 125 may include one or more prism sheets and/or one or more diffusion sheets. The plurality of sheets included in the optical sheet 125 may be adhered to each other and/or pressed against each other.

The optical sheet 125 may include a plurality of sheets having different functions. For example, the optical sheet 125 may include first to third optical sheets 125a to 125c. The first optical sheet 125a may have a function of a diffusion sheet, and the second and third optical sheets 125b and 125c may have a function of a prism sheet. The number and/or position of the diffusion sheet and the prism sheet may vary.

The diffusion sheet may prevent light, emitted from the diffusion plate, from being partially concentrated to obtain uniform brightness of light. The prism sheet may collect light emitted from the diffusion sheet to cause light to be incident perpendicular to the display panel 110.

The coupling portion 125d may be formed at least one of sides or edges of the optical sheet 125. The coupling portion 125d may be formed in at least one of the first to third optical sheets 125a to 125c.

The coupling portion 125d may be formed at a long side or an edge of the optical sheet 125. The coupling portion 125d, formed at the first long side, and the coupling portion 125d formed at the second long side may be asymmetrical to each other. For example, the coupling portion 125d at the first long side and the coupling portion 125 at the second long side may be different in position and/or number from each other.

Figure 4:
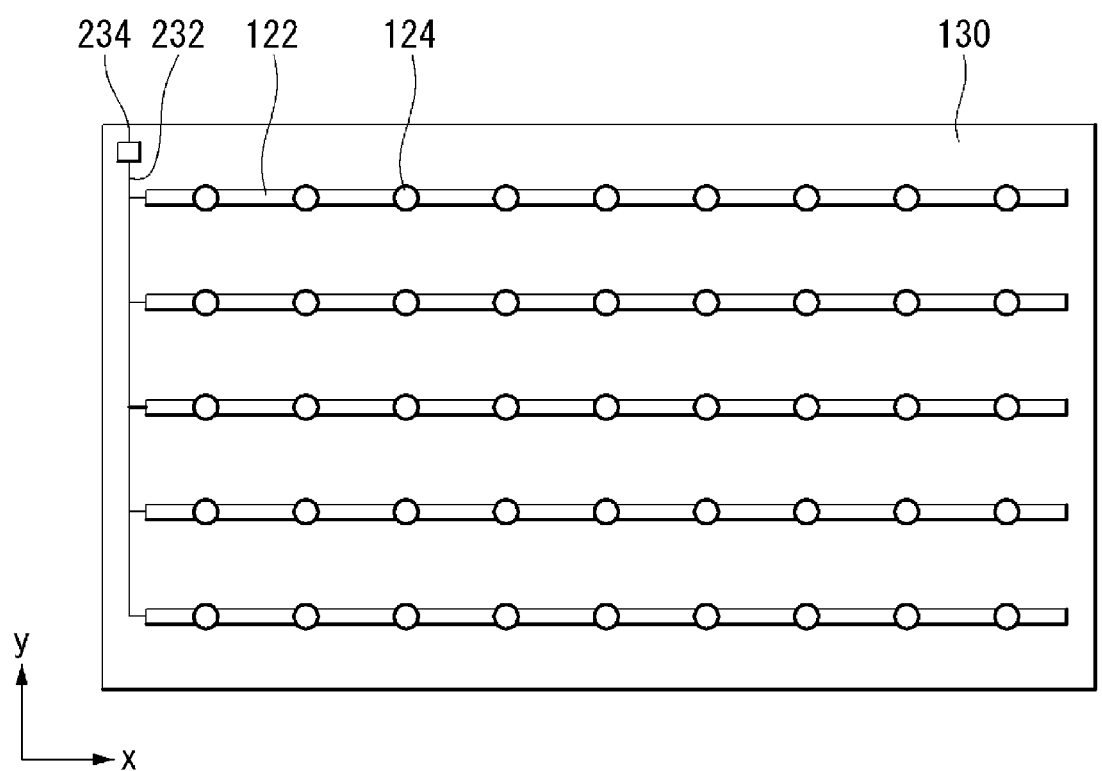

Referring to FIG. 4, the substrate 122 is formed with a plurality of straps extending in a first direction on the frame 130 and being spaced apart from each other at predetermined intervals in a second direction perpendicular to the first direction. A plurality of substrates 122 may be connected to a wiring electrode 232 at one side.

The wiring electrode 232 may extend in the second direction. The wiring electrode 232 may be connected to one side of the substrate 122 with a predetermined distance therebetween in the second direction.

A wiring hole 234 may be formed at one end of the wiring electrode 232. The wiring hole 234 may be a fine hole penetrating through the frame 130. The wiring electrode 232 may extend to a rear surface of the frame 130 through the wiring hole 234. The wiring electrode 232 may be electrically connected to an adapter (not shown), positioned on the rear surface of the frame 130, through the wiring hole 234.

The optical assemblies 124 may be mounted on the substrate 133 at predetermined intervals in the first direction. The diameter of the optical assemblies 124 may be greater than the width of the substrate 122 in the second direction.

Figure 5:
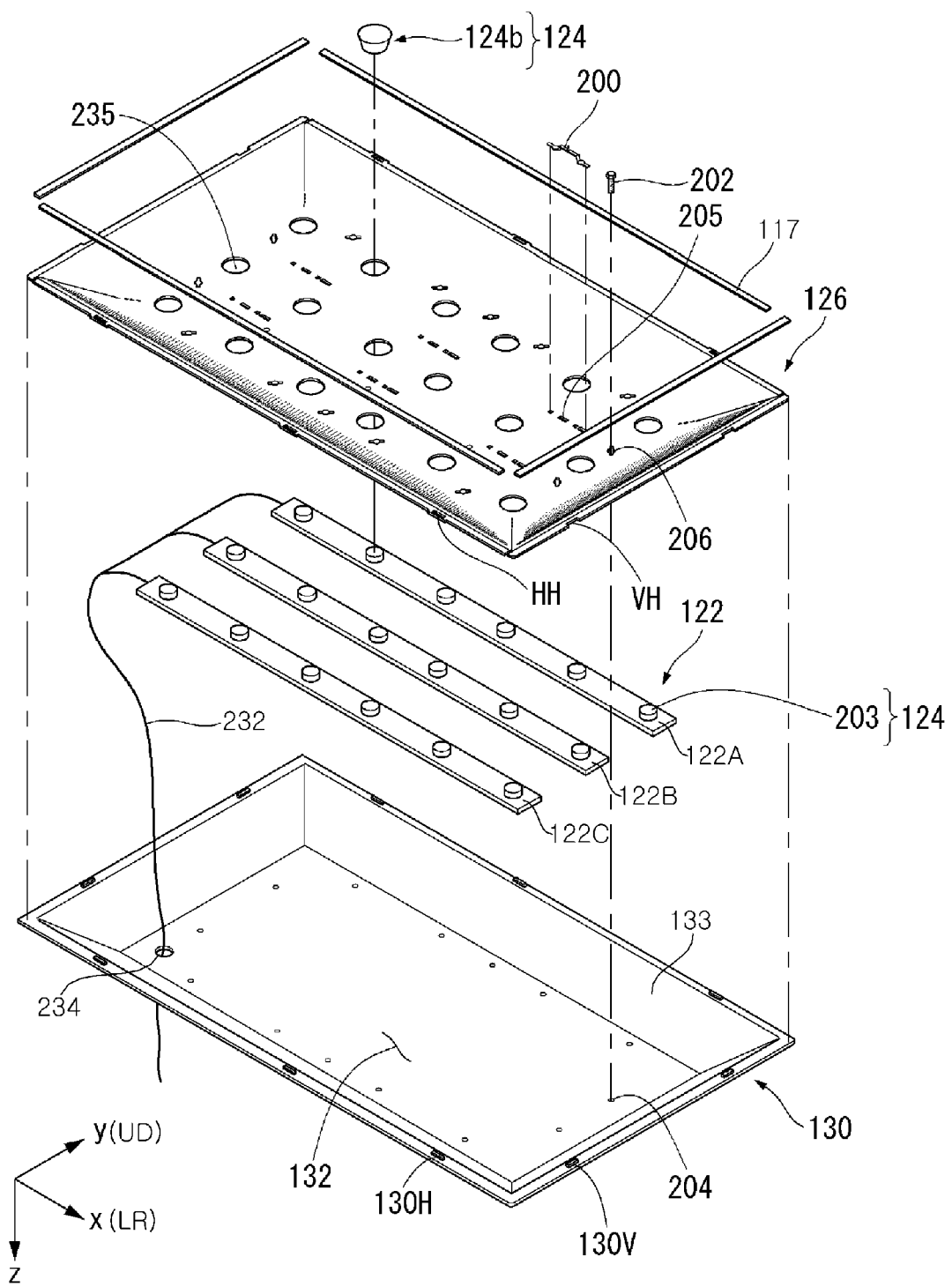

Referring to FIG. 5, the frame 130 may include a flat plate portion 132 and an inclined portion 133. The flat plate portion 132 may have a plate shape. The inclined portion 133 may be inclined at a predetermined slope from the flat plate portion 132 and may extend forward from the flat plate portion 132. The frame 130 may have an overall tub shape corresponding to a shape of the frame 130. A space may be formed between the inclined portion 133 and the reflective sheet 126.

The substrate 122 may be mounted or disposed on the flat plate portion 132. A plurality of substrates 122 may be disposed in sequence. The plurality of substrates 122 may be spaced apart from each other. For example, a first substrate 122A may extend long in the left and right direction LR of the frame 130, and may be disposed in a longitudinal direction, which is the left and right direction LR of the frame 130. A second substrate 122B may extend long in the left and right direction LR of the frame 130, while being mounted on the frame 130 at a position spaced apart from the first substrate 122A. A third substrate 122C may extend long in the left and right direction LR of the frame 130, while being mounted on the frame 130 at a position spaced apart from the second substrate 122B.

Intervals between the substrates 122 may vary depending on the number of pixels of the display panel 110 (see FIG. 2). For example, intervals between the substrates 122 for providing light to the display panel 110, which provides 8K image quality, may be smaller than intervals between the substrates 122 providing light to the display panel 110 which provides 4K image quality. If the number of pixels of the display panel 110 or the image quality provided by the display panel 110 increases, light transmittance of the display panel 110 may decrease. Accordingly, in order to increase the brightness of light provided by the backlight unit 120 (see FIG. 3), a large number of substrates 122 may be disposed.

The reflective sheet 126 may have the through holes 235. The plurality of through holes 235 may correspond to the number of the plurality of optical assemblies 124. The reflective sheet 126 may be placed on the frame 130 and/or the substrate 122. In this case, lenses 124b of the plurality of optical assemblies 124 may be inserted into the plurality of through holes 235 to protrude upward from the reflective sheet 125. The reflective sheet 126 may be coupled or fixed on the frame 123 by a fixing member 202. The supporter 200 may be mounted on the reflective sheet 126.

Coupling ribs 130H and 130V may be formed on an upper end of the inclined portion 133 of the frame 130. The reflective sheet 126 has coupling holes VH and HH, through which the ribs 130H and 130V may be inserted, thereby allowing the reflective sheet 16 to be fixed on the frame 130.

The guide panel 117 may be disposed on an outer side of the reflective sheet 126, and may be coupled to the frame 130. The guide panel 117 may support the display panel 110 (see FIG. 2). The guide panel 117 may be disposed on four sides of the reflective sheet 126.

Figure 6:
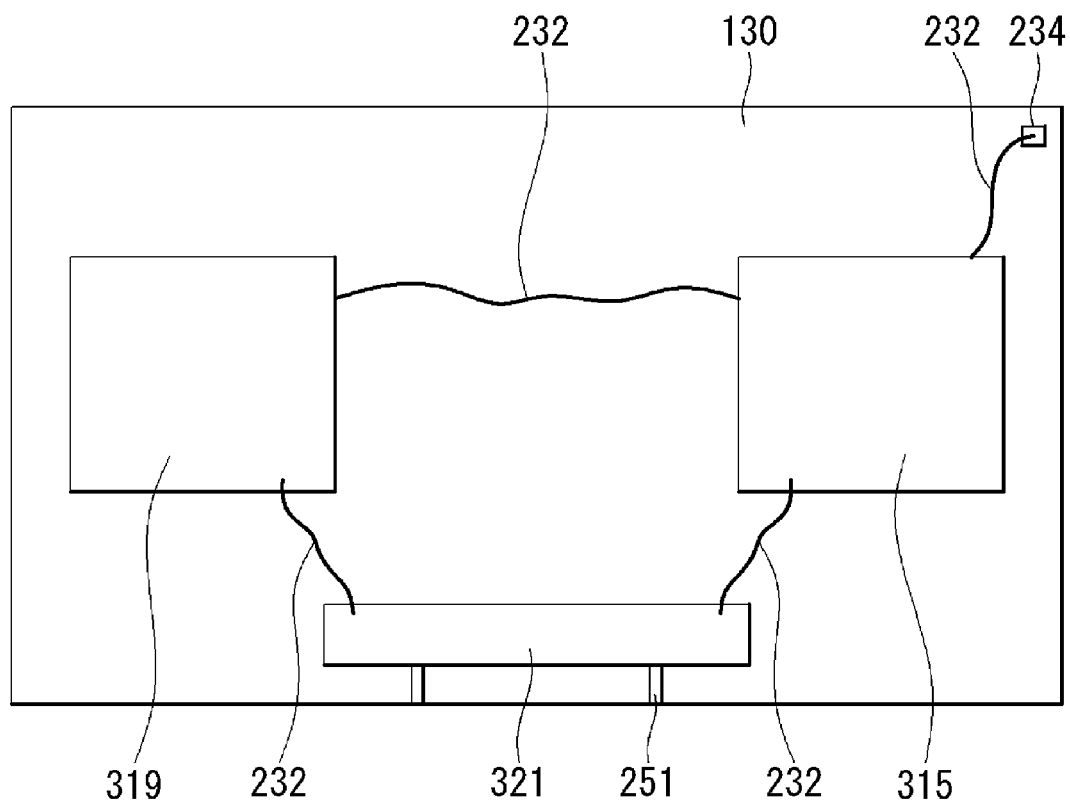

Referring to FIG. 6, the wiring electrode 232, extending from a front surface of the frame 130 through the wiring hole 234, may be electrically connected to a power supply 315. The power supply 315 may be a PCB supplying power to the display device 100. The power supply 315 may change AC power into DC power.

The power supply 315 may supply power to the optical assembly 124 through the wiring electrode 2332. The power supply 315 may be electrically connected to a main board 321 through the wiring electrode 232. That main board 321 may be spaced apart from the power supply 315 by a predetermined distance.

The main board 321 may be a PCB providing an interface for operating the display device 100. Further, the main board 321 may check and manage an operating state of each component of the display device 100.

The main board 321 and the power supply 315 may be electrically connected to a T-CON board 319 through the wiring electrode 232. The T-CON board 319 may be a PCB transmitting power or signals, input from the main board 321 or the power supply 315, to the display panel 110. The T-CON board 319 may be electrically connected to the display panel 110 on a front surface of the frame 130 through a flat flex cable 251 (FFC).

Although FIG. 6 illustrates an example in which the respective PCBs are connected to each other, but the present disclosure is not limited thereto, and only at least some of the PCBs may be connected to each other.

Figure 7:
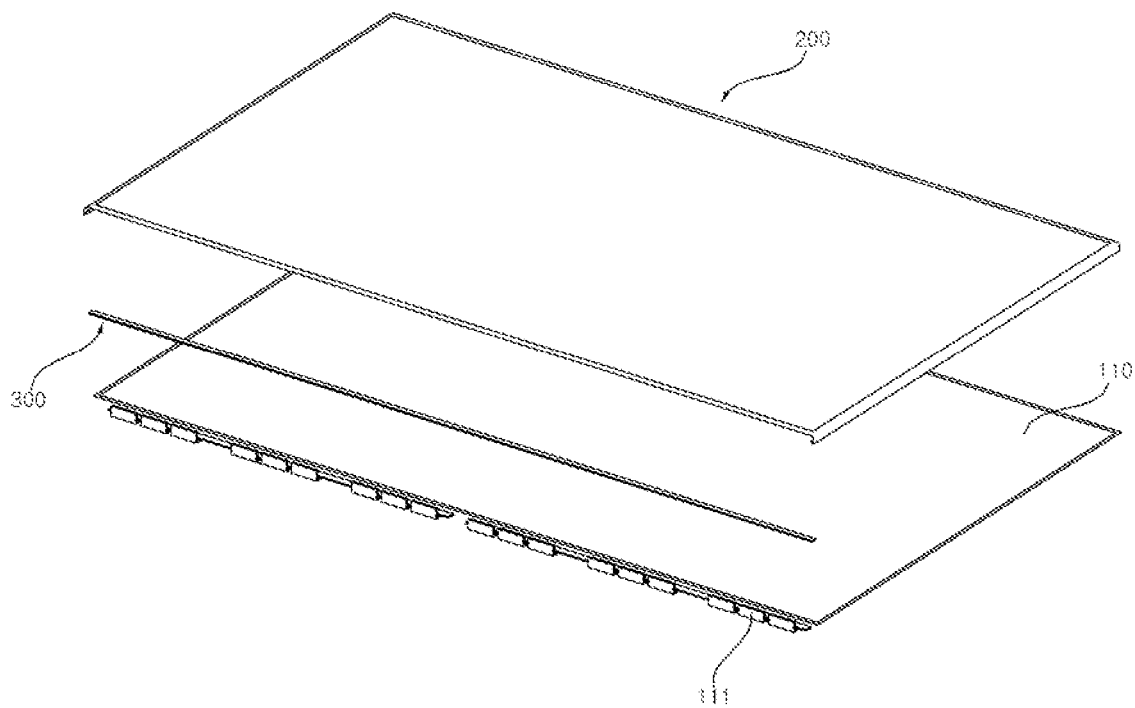
FIGS. 7 to 20 are diagrams illustrating examples of a display device according to embodiments of the present disclosure.

Referring to FIG. 7, a cable 111 may be electrically connected to the display panel 110. For example, the cable 111 may be a flexible printed circuit board (FPCB) or a chip on film (COF). A plurality of cables 111 may be connected to a lower side of the display panel 110.

A front sheet 200 may cover the front surface of the display panel 110. A cable cover 300 may be provided between the front sheet 200 and the display panel 110. The cable cover 300 may have rigidity. The cable cover 300 may protect the cable 111.

Figure 8:
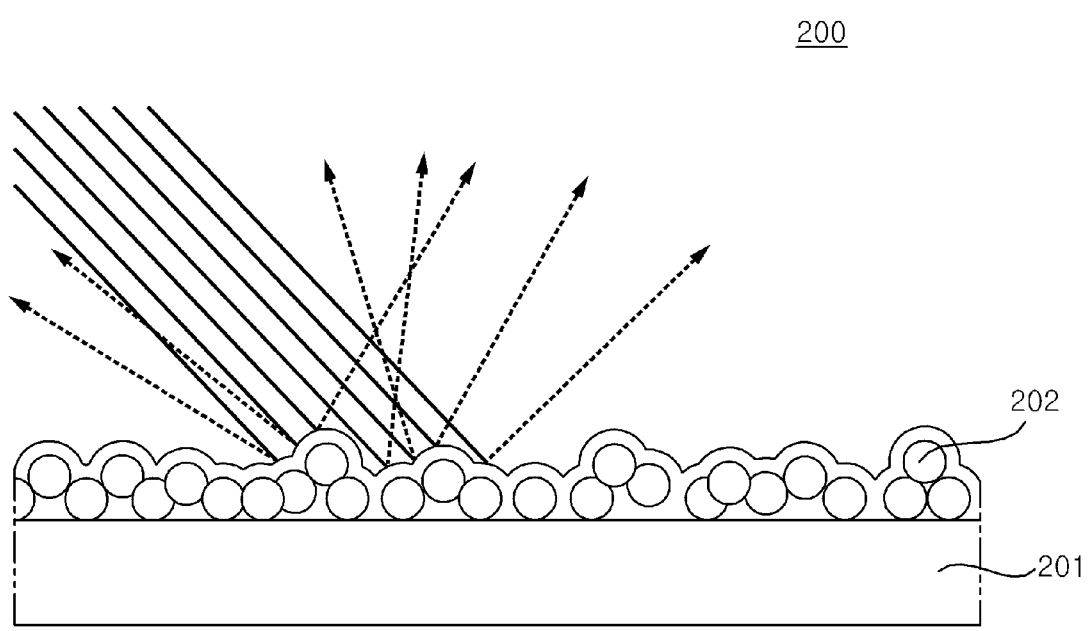
Figure 9:
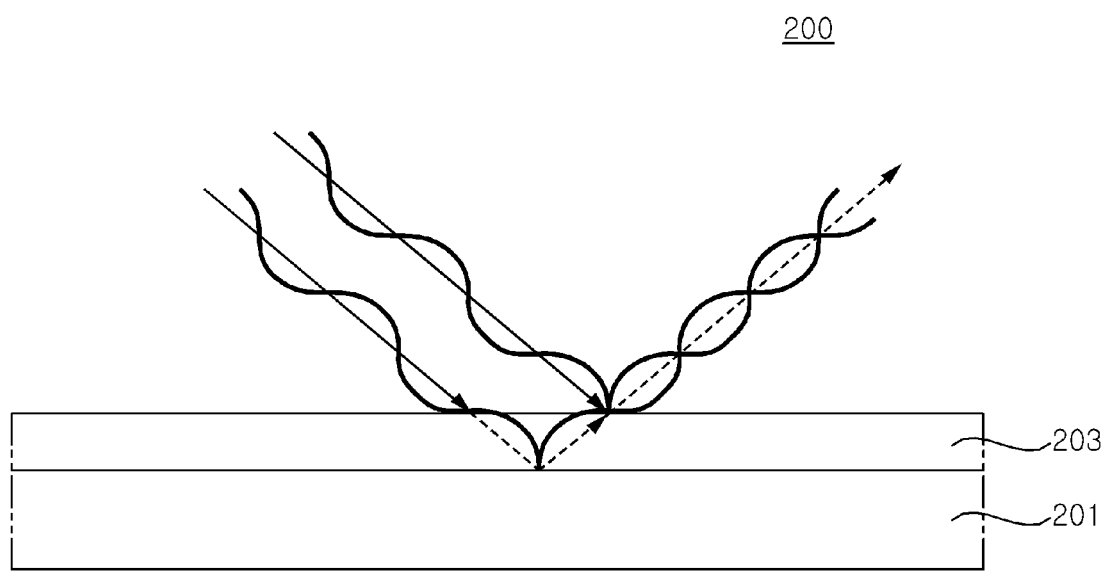

Referring to FIGS. 8 and 9, the front sheet 200 may allow light to pass therethrough. The front sheet 200 may be made of a light-transmitting material. For example, the front sheet 200 may be a triacetyl cellulose (TAC) film or a polyester (PET) film. A front surface 201 of the front sheet 200 may be coated. For example, the coating may be an anti-glare coating (see FIG. 8) or an anti-reflective coating (see FIG. 9). The anti-glare coating may be formed by coating a plurality of particles 202 on the front surface 201 of the front sheet 200. The anti-reflective coating may be formed by coating a coating layer 203 on the front surface 201 of the front sheet 200. By forming the anti-glare coating, reflectivity of the front surface 201 of the front sheet 200 may be 6% or less, and haze may be 10% or less.

Figure 10:
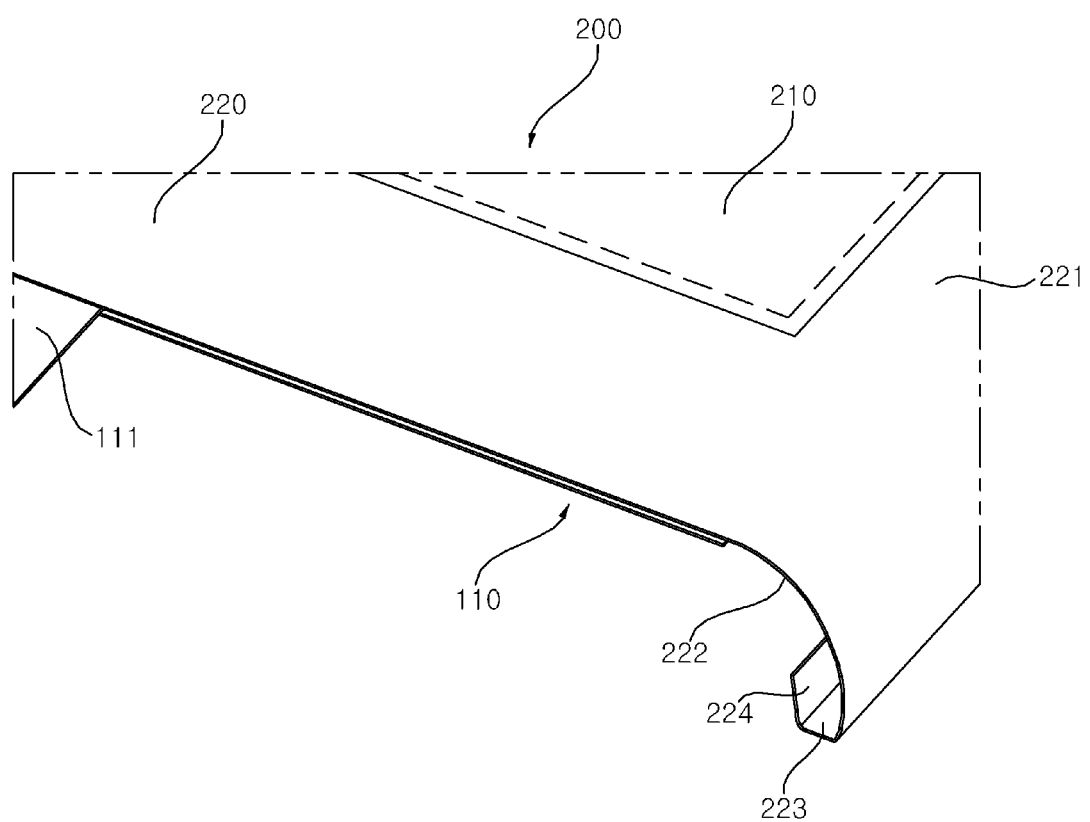
Figure 11:
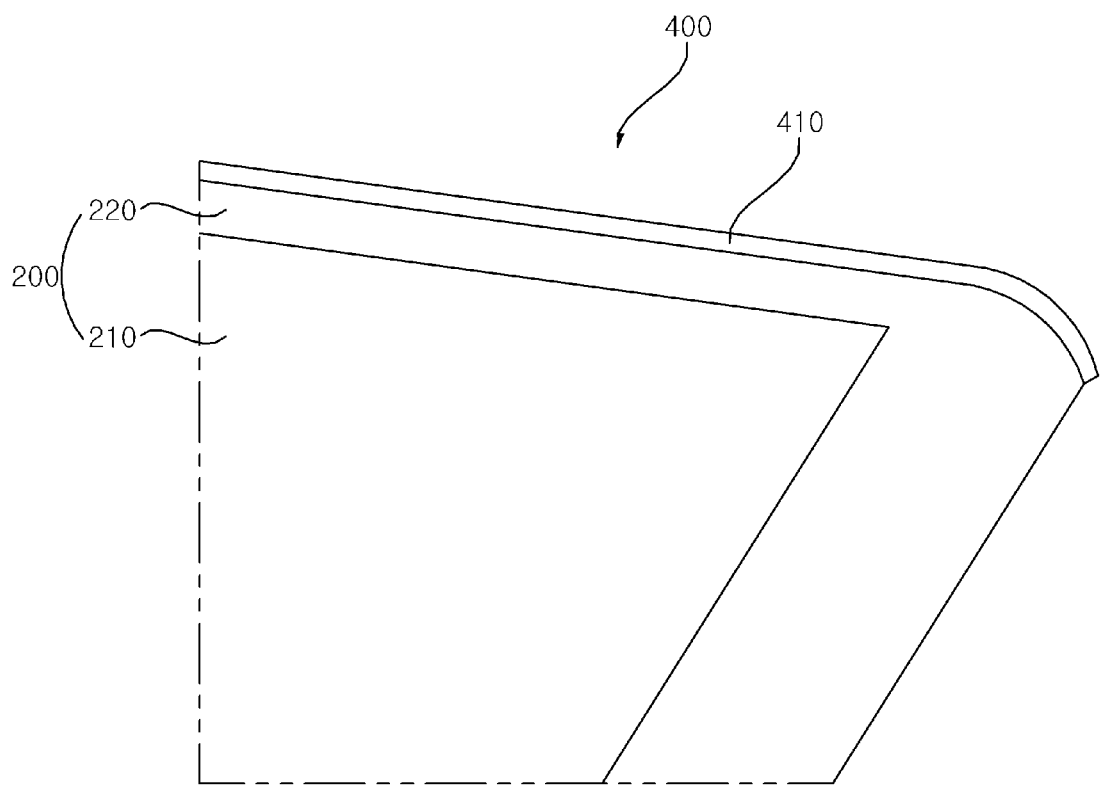

Referring to FIGS. 10 and 11, the front sheet 200 may extend while covering the side surface of the display panel 110. The side surface of the display panel 110 may include a left side surface and a right side surface. The front sheet 200 may be rounded and curved at the side surface of the display panel 110. An end of the front sheet 200 may be curved by being bent toward the side surface of the display panel 110.

An upper side of the front sheet 200 may be disposed corresponding to the upper side of the display panel 110, and a lower side of the front sheet 200 may be disposed corresponding to the lower side of the display panel 110. An end frame 400 may be disposed adjacent to the upper side and/or the lower side of the display panel 110. The end frame 400 may include an upper end frame 410 and a lower end frame 420 (see FIG. 13).

The front sheet 200 may include a light transmitting portion 210, made of a transparent material, and a light shielding portion 220. The light transmitting portion 210 may correspond to an active area of pixels of the display panel 110, and the light shielding portion 220 may correspond to an inactive area of the pixels of the display panel 110. For example, images may be displayed through the light transmitting portion 210, and the light shielding portion 220 may cover a bezel of the display panel 110.

Figure 12:
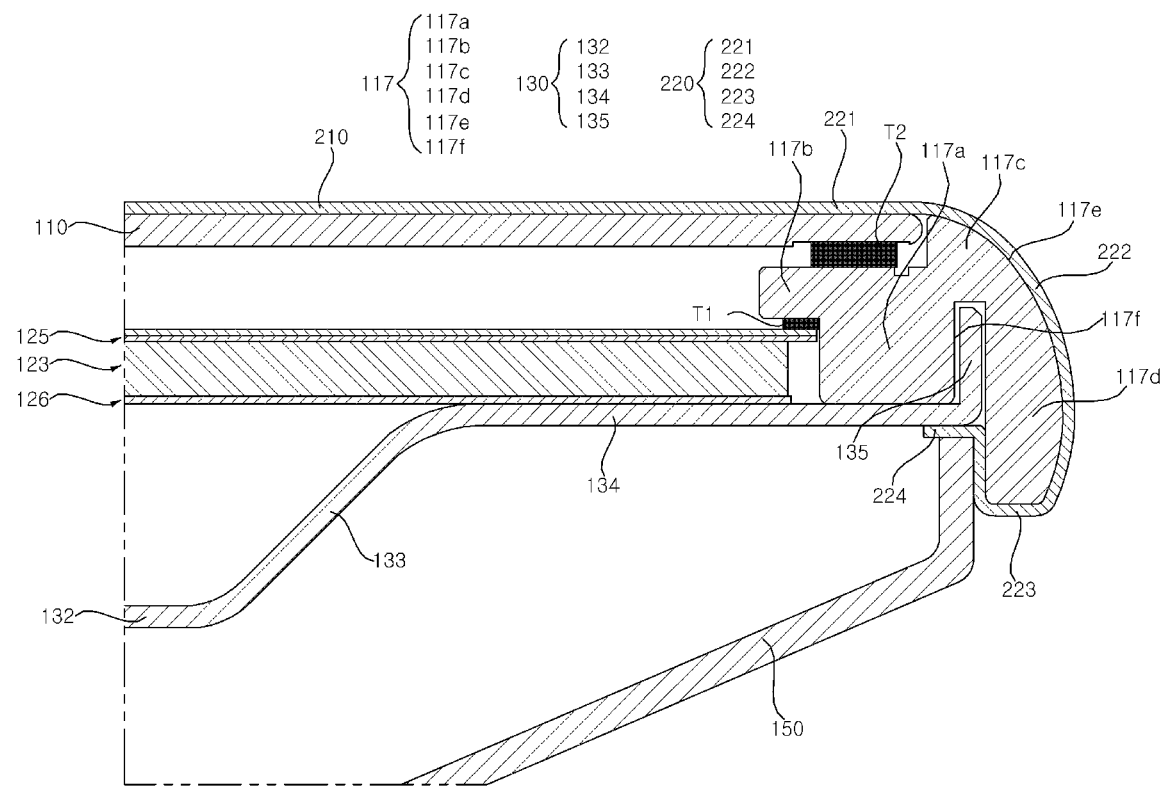

Referring to FIG. 12, the frame 130 may include a flat plate portion 132, an inclined portion 133, a support portion 134, and a coupling portion 135. The flat plate portion 132 may have a plate shape. The inclined portion 133 may extend at an incline from the flat plate portion 132 toward the front side of the display device. The support portion 134 may extend from the inclined portion 133 toward the side surface of the display device. The support portion 134 may be in parallel to the flat plate portion 132. The coupling portion 135 may extend from the support portion 134 while being curved toward the front side of the display device. The coupling portion 135 may extend perpendicular to the support portion 134.

The optical layer 123 may include a light guide panel 123. The optical layer 123 may be referred to as the light guide panel 123. The light guide panel 123 may be placed on the support portion 134. The support portion 134 may support the light guide panel 123. The reflective sheet 126 may be disposed between the light guide panel 123 and the support portion 134. A space may be formed between the reflective sheet 126 and the flat plate portion 132. The reflective sheet 126 may come into contact with a rear surface of the light guide panel 123. The optical sheet 125 may be disposed on a front surface of the light guide panel 123. The optical sheet 125 may be formed with a plurality of layers. For example, the optical sheet 125 may be a prism sheet and/or a diffusion sheet.

The guide panel 117 may include inner parts 117a and 117b and outer parts 117c and 117d. The inner parts 117a and 117b may include a first inner part 117a and a second inner part 117b. The first inner part 117a may come into contact with the support portion 134. The support portion 134 may support or come into contact with a lower surface of the first inner part 117a. The thickness or height of the first inner part 117a may be equal to or greater than the thickness or height of the reflective sheet 126, the light guide panel 123, and the optical sheet 125. The second inner part 117b may be coupled to the first inner part 117a. A portion of the second inner part 117b may form a step with the first inner part 117a. A portion of the second inner part 117b may be spaced apart from the front surface of the optical sheet 125 or may press the front surface of the optical sheet 125. A portion of the second inner part 117b may be spaced apart from the front surface of the optical sheet 125, and a pad T1 may be inserted between the optical sheet 125 and a portion of the second inner part 117b.

The outer parts 117c and 117d may be coupled to the inner parts 117a and 117b. A coupling groove 117f may be formed between the inner parts 117a and 117b and the outer parts 117c and 117d. The coupling portion 135 of the frame 130 may be inserted into the coupling groove 117f. The outer parts 117c and 117d may include a first outer part 117c and a second outer part 117d. The first outer part 117c may have a fan-shaped cross-section. The first outer part 117c may cover the side surface of the display panel 110. The second outer part 117d may be coupled to the first outer part 117c. The second outer part 117d may have a curved surface 117e formed by a rounded outer surface. An outer surface of the first outer part 117c and an outer surface of the second outer part 117d may be coupled to each other with no step formed therebetween.

The display panel 110 may be placed on the inner part 117a and 117b. The second inner part 117b may support the rear surface of the display panel 110. An inner surface of the first outer part 117c may cover the side surface of the display panel 110. A coupling pad T2 may be disposed between the display panel 110 and the inner parts 117a and 117b. For example, the coupling pad T2 may be a double-sided tape having elasticity.

The front sheet 200 may cover the front surface of the display panel 110 and may cover the outer surface of the outer parts 117c and 117d. The light transmitting portion 210 of the front sheet 200 may cover the front surface of the display panel 110, and the light shielding portion 220 of the front sheet 200 may cover the outer surface of the outer parts 117c and 117d. The light shielding portion 220 may extend from the light transmitting portion 210, starting from an area of the display panel 110 which overlaps the coupling pad T2, so as to come into contact with the frame 130 while covering the outer surface of the outer parts 117c and 117d. The back cover 150 may be coupled to the rear side of the frame 130. An end of the back cover 50 may press the front sheet 200. The front sheet 200 may be disposed between the back cover 150 and the support portion 134 of the frame 130. The light shielding portion 220 may include: a bezel portion 221 coupled to the light transmitting portion 210; a side portion 222 extending from the bezel portion 221 and covering an outer curved surface 117e of the outer parts 117c and 117d; a connecting portion 223 extending from the side portion 222 and wound around the second outer part 117d; and an end portion 224 inserted between the second outer part 117d and the back cover 150.

Accordingly, damage to the display panel 110 may be prevented and reliability of the display device may be improved. Further, the display panel 110 may display images with improved black color reproduction.

Figure 13:
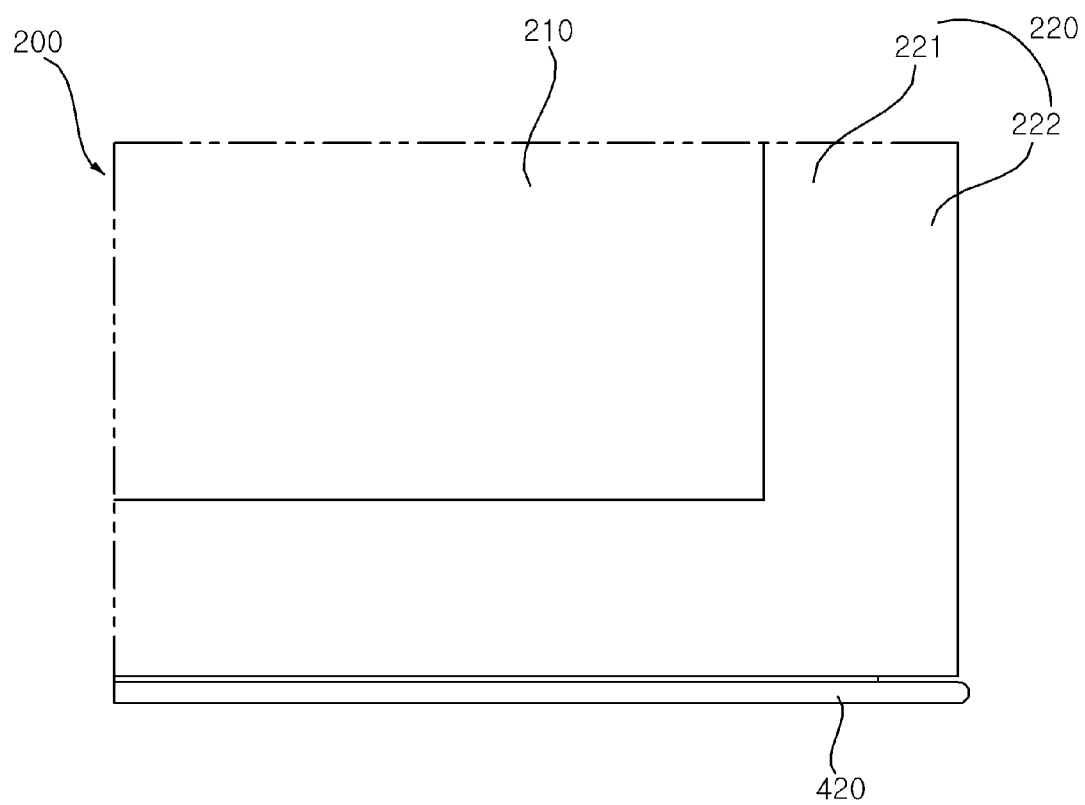
Figure 14:
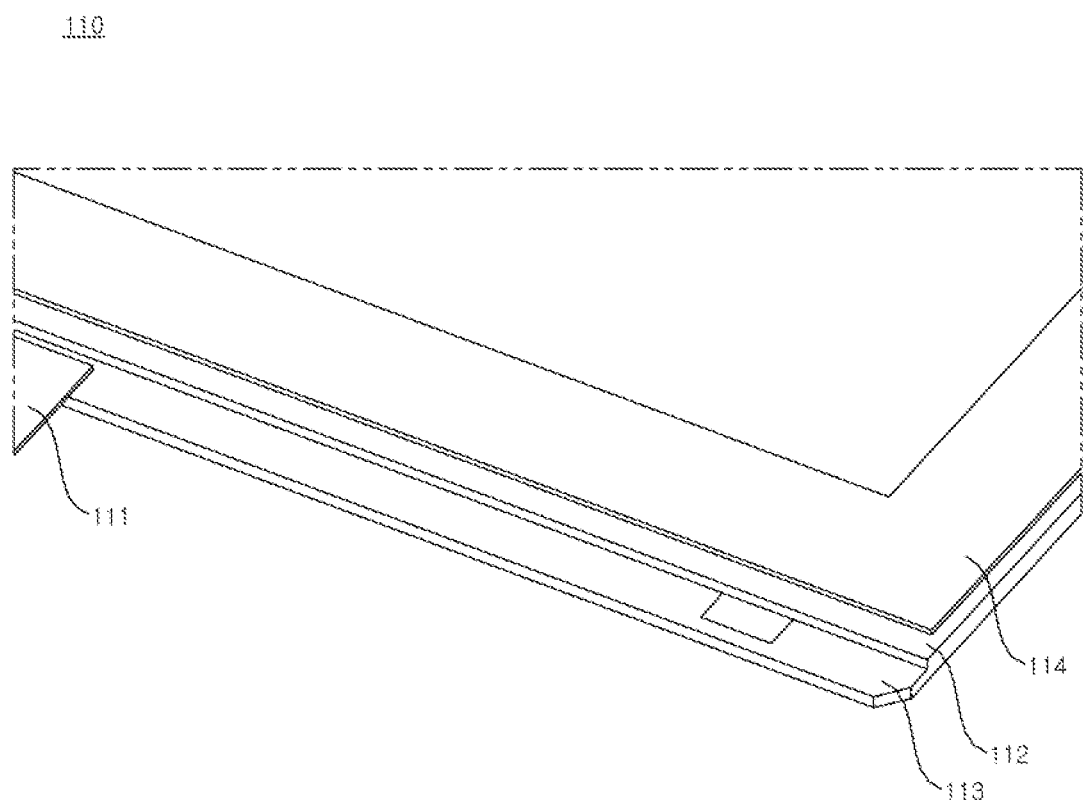
Figure 15:
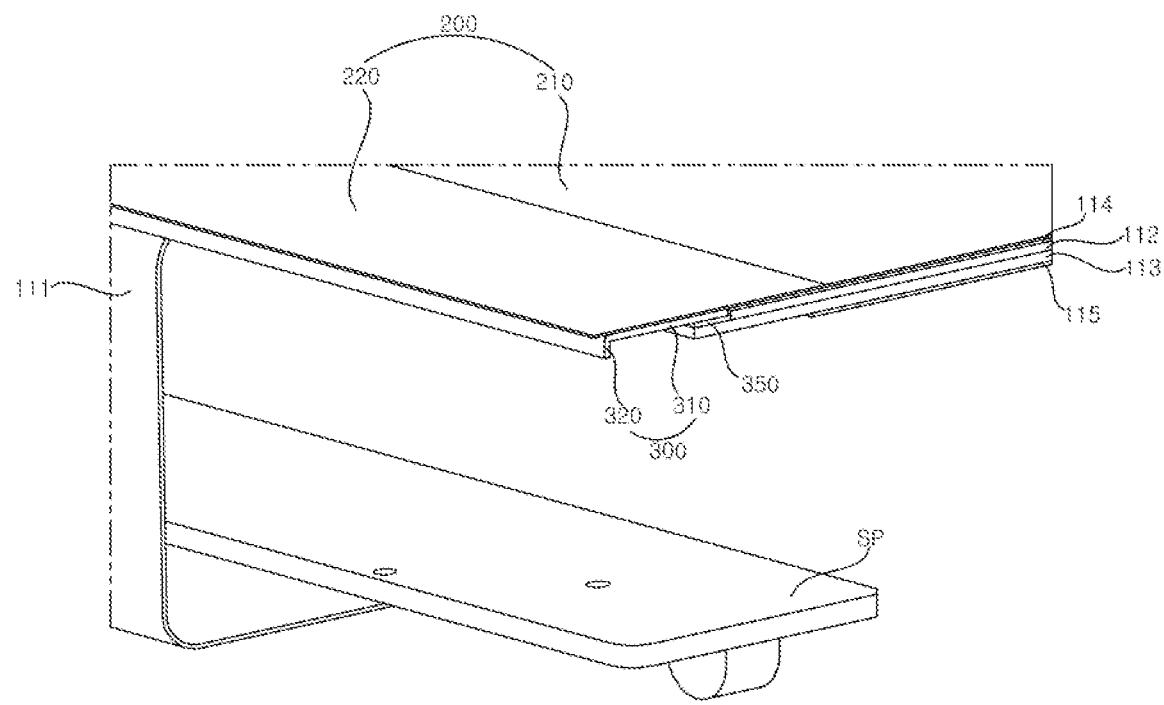
Figure 16:
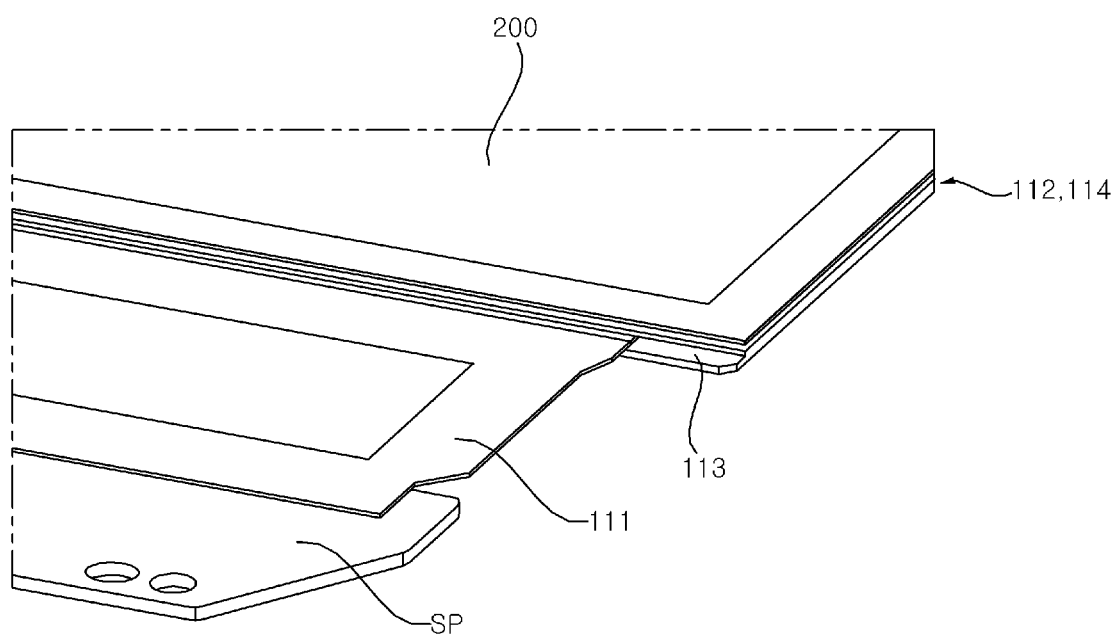
Figure 17:
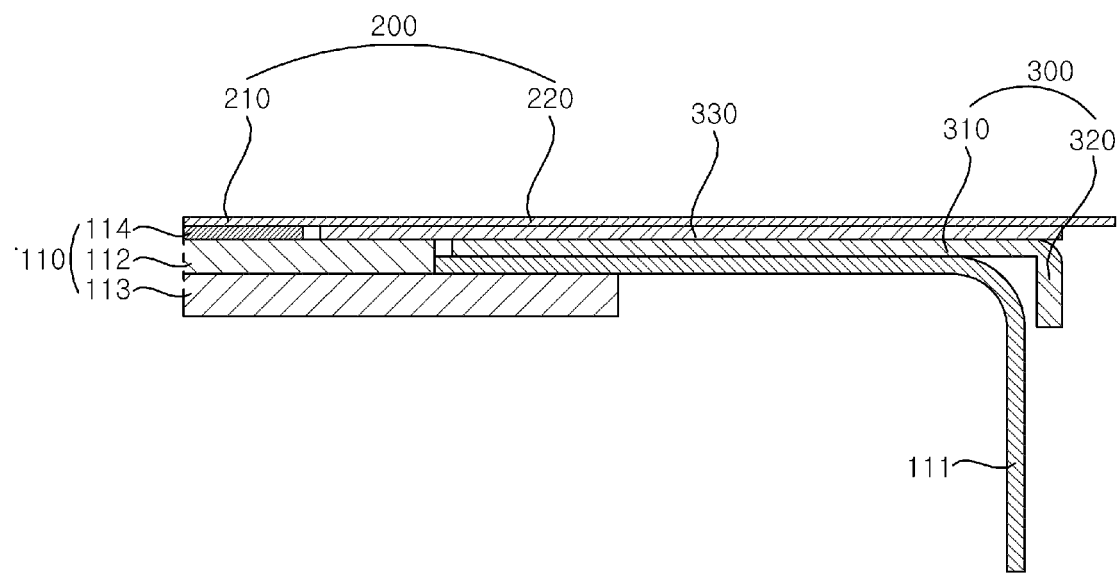

Referring to FIG. 13, a lower end frame 420 may be disposed adjacent to the lower side of the front sheet 200 to cover the lower surface of the front sheet 200. The lower end frame 420 may be disposed opposite an upper end frame 410 (see FIG. 11) with respect to the front sheet 200. An upper end frame 410 may cover the upper side of the front sheet 200 and/or the display panel 110, and the lower end frame 420 may cover the lower side of the front sheet 200 and/or the display panel 110.

Referring to FIGS. 14 to 17, the display panel 110 may include a front substrate 112, a rear substrate 113, a front film 114, a rear film 115, a cable 111, and a source PCB (SP). For example, the front film 114 and/or the rear film 115 may be polarized films. An area of the front substrate 112 may be greater than an area of the front film 114. An area of the rear substrate 113 may be greater than an area of the front substrate 112. An area of the rear film 115 may be smaller than an area of the rear substrate 113.

The cable 111, for example, a chip on flexible (COF), may be connected between the front substrate 112 and the rear substrate 113. The COF 111 may be connected to the source PCB (SP). The cable 111 may be bent in a U shape, to be connected to the source PCB (SP).

The cable cover 300 may be a metal plate. The cable cover 300 may include a first plate 310 and a second plate 320. The first plate 310 may be fixed to the front surface of the rear substrate 113. The COF 111 may be disposed between the rear substrate 113 and the cable cover 300. The first plate 310 may be coupled or fixed to the rear substrate 113 by a UV resin 350. For example, bonding with the UV resin 350 may be cured by exposure to radiation emitted by a UV lamp from the rear substrate 113 toward the front substrate 112. Here, the display panel 110 is inverted to allow the UV lamp to emit light thereto, such that process efficiency may be reduced.

The front sheet 200 may be fixed to the front surface of the display panel 110. The front sheet 200 may be fixed to the front film 114. A gap cover 330 may be fixed to the front substrate 112 and the first plate 310 of the cable cover 300. The gap cover 330 may have the same thickness as that of the front film 114. For example, a sum of the thickness of the COF 111 and the cable cover 300 may be substantially equal to the thickness of the front substrate 112. The light transmitting portion 210 of the front sheet 200 may be fixed to the front film 114, and the light shielding portion 220 may be fixed to the gap cover 330.

Figure 18:
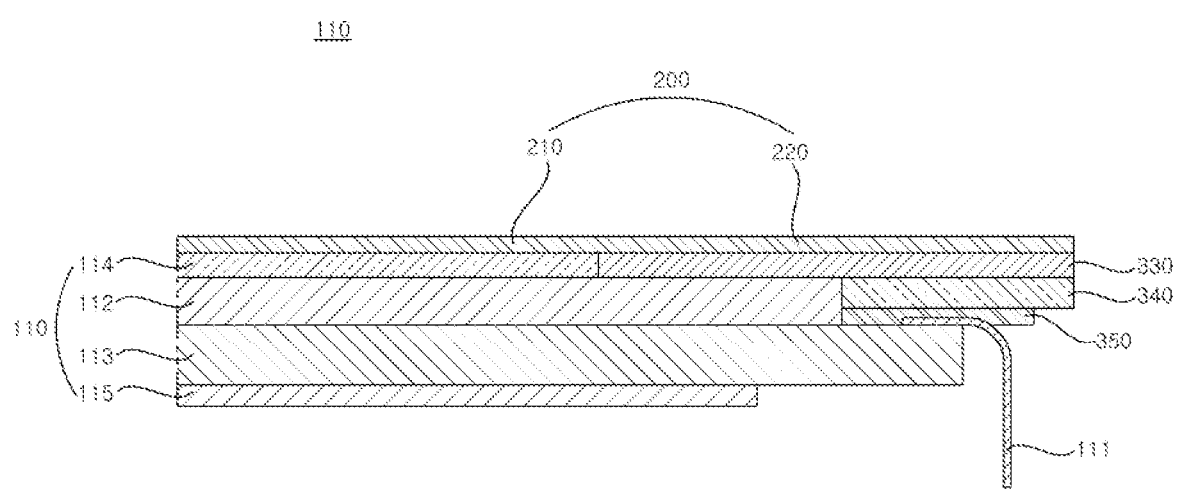

Referring to FIG. 18, the COF 111 may be fixed or coupled to the rear substrate 113 by an adhesive member 350. The adhesive member 350 may be referred to as an adhesive layer 350. For example, the adhesive member 350 may be the UV resin 350. A buffer layer 340 may be disposed between the adhesive member 350 and the gap cover 30. The gap cover 330 may be disposed between the light shielding portion 220 and the buffer layer 340. The buffer layer 340 may be stacked on the adhesive member 350 to which the COF 111 is connected. For example, a thickness of the buffer layer 340 and a thickness of the adhesive member 350 may be substantially equal to a thickness of the front substrate 112. The gap cover 330 may be stacked on the front substrate 112 and the buffer layer 340. For example, the thickness of the gap cover 330 may be substantially equal to the thickness of the front film 14.

The buffer layer 340 and the gap cover 330 may be made of a light-transmitting material. For example, the buffer layer 340 may be PET, and the gap cover 330 may be PET. The adhesive layer 350 may be cured by exposure to radiation emitted by a UV lamp. For example, the UV lamp may emit light from the front substrate 112 toward the rear substrate 113. In another example, the UV lamp may emit light from the rear substrate 113 toward the front substrate 112. Accordingly, the adhesive layer 350 may be cured without inverting the display panel 110, such that process efficiency may be improved.

Figure 19:
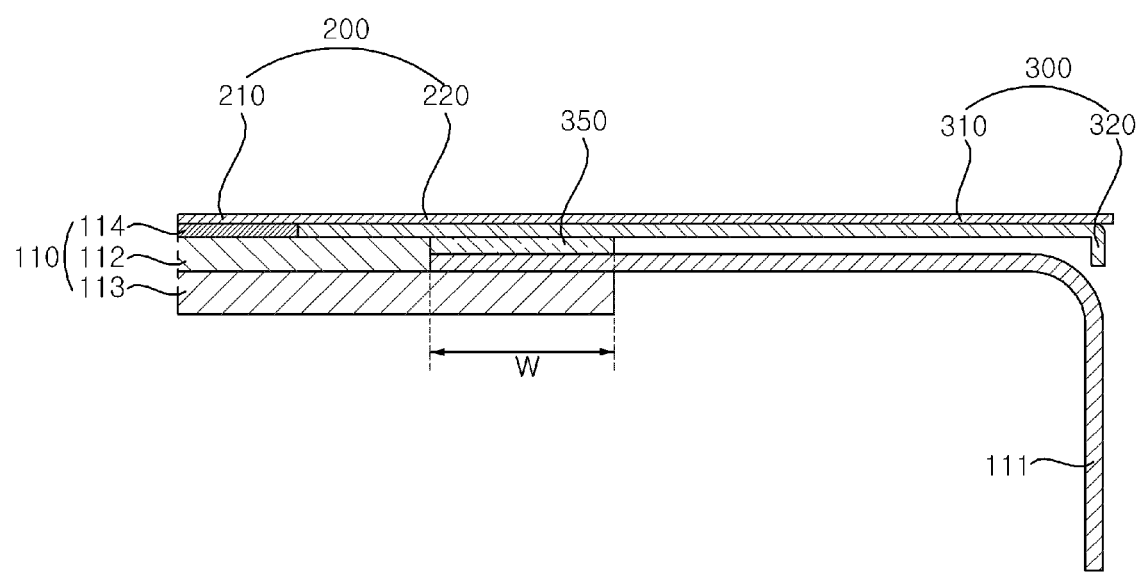

Referring to FIG. 19, the COF 111 may be fixed to the rear substrate 113. The adhesive layer 350 may be stacked on the COF 111. A sum of the thickness of the COF 111 and the thickness of the adhesive layer 350 may be substantially equal to the thickness of the front substrate 112. The adhesive layer 350 may overlap the rear substrate 113. The cable cover 300 may be stacked on the front substrate 112 and/or the adhesive layer 350. The cable cover 300 may be fixed to the front substrate 112.

The thickness of the cable cover 300 may be substantially equal to the thickness of the front film 114. The adhesive layer 350 may be disposed between the cable cover 300 and the rear substrate 113. An area of the adhesive layer 350 may correspond to an area of the rear substrate 113, which is exposed by a difference in area between the front substrate 112 and the rear substrate 113. For example, a width W of the adhesive layer 350 may be substantially equal to a width W of the rear substrate 113 exposed to the outside.

Figure 20:
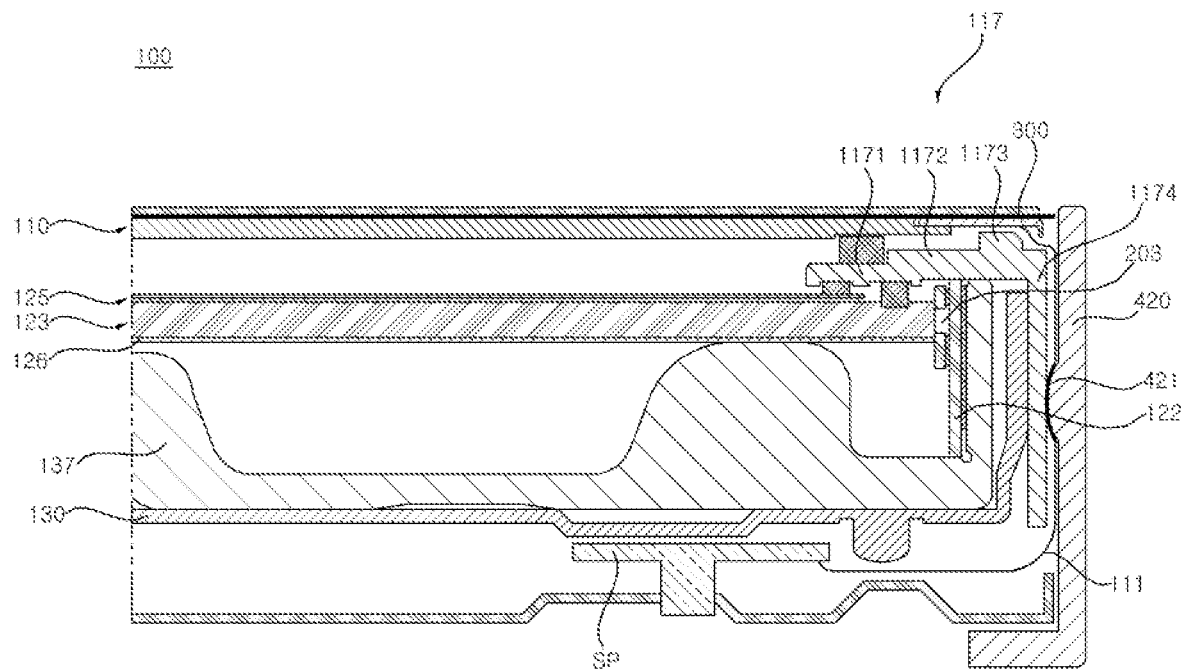

Referring to FIG. 20, a heat sink 137 may be disposed between the frame 130 and the reflective sheet 126. The heat sink 137 may be formed by pressing a metal plate. The substrate 122 may be mounted on the heat sink 137. A light source 203 is mounted on the substrate 122, and may be disposed between the light guide panel 123 and the substrate 122. Light provided by the light source 203 may be introduced into the light guide panel 123. The light, introduced into the light guide panel 123, may be provided to the display panel 110.

The guide panel 117 may be disposed between the frame 130 and the lower end frame 420. The guide panel 117 may be a lower guide panel 117. The guide panel 117 may include a first part 1171, a second part 1172, a third part 1173, and a fourth part 1174. The first part 1171 may be disposed between the display panel 110 and the optical sheet 125. The second part 1172 may be disposed between the light guide panel 123 and the display panel 110 and/or the cable cover 300. The third part 1173 may be disposed between the end portion of the frame 130 and the cable cover 300. The fourth part 1174 may be disposed between the frame 130 and the lower end frame 420.

The third part 1173 may extend while being curved from the fourth part 1174; the second part 1172 may extend from the third part 1173 while forming a step with the third part 1173; and the first part 1171 may extend from the second part 1172 while forming a step with the second part 1172. The height of the steps may gradually decrease from the third part 1173 toward the first part 1171.

The lower end frame 420 may cover the lower side of the frame 130 and the fourth part 1174 of the guide panel 117. A protrusion 421 may be formed between the lower end frame 420 and the frame 130, and may protrude from the lower end frame 420.

The COF 111 may pass between the cable cover 300 and the third part 1173. The COF 111 may be disposed between the fourth part 1174 of the guide panel 117 and the protrusion 421 of the lower end frame 420. The protrusion 421 may allow the COF 111 to be fixed to the guide panel 117 while being in contact with the guide panel 117. The COF 111 may extend to the source PCB (SP) by passing between the protrusion 421 and the guide panel 117, to be connected to the source PCB (SP).

In accordance with an aspect of the present disclosure, provided is a display device, including: a display panel; a frame disposed at a rear of the display panel; a light source disposed between the display panel and the frame, and configured to provide light to the display panel; a guide panel disposed adjacent to an edge of the display panel and coupled to the frame, and configured to support the display panel; and a front sheet including a light transmitting portion covering a front surface of the display panel, and a light shielding portion extending from the light transmitting portion and covering the guide panel, wherein the guide panel includes: an inner part disposed between the frame and the display panel and configured to support a rear surface of the display panel adjacent to the edge of the display panel; and an outer part disposed toward an outer side of the frame and configured to cover a side surface of the edge of the display panel.

In accordance with another aspect of the present disclosure, the guide panel may further include a coupling groove formed between the inner part and the outer part, wherein an end of the frame may be inserted into the coupling groove; and the front sheet may contact a rear surface of the frame and covers the outer part of the guide panel.

In accordance with another aspect of the present disclosure, the display device may further include a back cover coupled to a rear of the frame, wherein a first side of an end portion of the front sheet may contacts the rear surface of the frame and a second side of the end portion of the front sheet contacts a portion of the back cover.

In accordance with another aspect of the present disclosure, an outer surface of the outer part of the guide panel may be formed with a curved surface which is covered by the front sheet.

In accordance with another aspect of the present disclosure, the display device may further include an end frame disposed adjacent to another edge of the display panel and corresponding edge of the front sheet.

In accordance with another aspect of the present disclosure, the display panel may include: a front substrate; a rear substrate; and a front film disposed between the front substrate and the front sheet, wherein an area of the rear substrate is greater than an area of the front substrate, such that a step is formed between the front substrate and the rear substrate; and the area of the front substrate is greater than an area of the front film, such that a step is formed between the front film and the front substrate.

In accordance with another aspect of the present disclosure, the display device may further include: a cable coupled to the display panel adjacent to the step formed between the front substrate and the rear substrate; and a cable cover disposed opposite the rear substrate with respect to the cable, wherein the cable cover may include: a first portion having an elongated shape with one side coupled to the rear substrate; and a second portion curved from an edge of the first portion.

In accordance with another aspect of the present disclosure, the display device may further include a gap cover disposed between the cable cover and the front sheet, wherein a thickness of the gap cover may be substantially equal to a thickness of the front film; and a combined thickness of the cable cover and the cable may be substantially equal to a thickness of the front substrate.

In accordance with another aspect of the present disclosure, the display device may further include an adhesive layer disposed between the cable cover and the cable, wherein a combined thickness of the cable and the adhesive layer may be substantially equal to a thickness of the front substrate; and a thickness of the cable cover may be substantially equal to a thickness of the front film.

In accordance with another aspect of the present disclosure, the display device may further include: a cable coupled to the display panel adjacent to the step formed between the front substrate and the rear substrate; the gap cover disposed between the front sheet and the cable; and a buffer layer disposed between the cable and the gap cover, wherein a combined thickness of the cable and the buffer layer may be substantially equal to the thickness of the front substrate; and the thickness of the gap cover may be substantially equal to the thickness of the front film.

In accordance with another aspect of the present disclosure, the gap cover and the buffer layer may be made of a light-transmitting material.

In accordance with another aspect of the present disclosure, the display device may further include a cable coupled to the display panel; and a source PCB coupled to a rear side of the frame, wherein the cable may pass between the frame and the end frame to connect the display panel to the source PCB.

In accordance with another aspect of the present disclosure, the end frame may further include a protrusion configured to secure the cable against the guide panel.

As is apparent from the above description, a display device according to the present disclosure has the following effects.

According to at least one embodiment of the present disclosure, a display device with improved optical characteristics may be provided.

According to at least one embodiment of the present disclosure, a display device having structural reliability may be provided.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a display panel;
    a frame disposed at a rear of the display panel;
    a light source disposed between the display panel and the frame, and configured to provide light to the display panel;
    a guide panel disposed adjacent to an edge of the display panel and coupled to the frame, and configured to support the display panel; and
    a front sheet comprising a light transmitting portion covering a front surface of the display panel, and a light shielding portion extending from the light transmitting portion and covering the guide panel,
    wherein the guide panel comprises:
    an inner part disposed between the frame and the display panel and configured to support a rear surface of the display panel adjacent to the edge of the display panel; and
    an outer part disposed toward an outer side of the frame and configured to cover a side surface of the edge of the display panel,
    wherein the display panel comprises a substrate forming a step with respect to the front surface of the display panel and forming another edge of the display panel,
    wherein the display device further comprises a cable coupled to the substrate and disposed between the substrate and the front sheet.

2. The display device of claim 1, wherein the guide panel further comprises a coupling groove formed between the inner part and the outer part,
    wherein:

an end of the frame is inserted into the coupling groove; and the front sheet contacts a rear surface of the frame and covers the outer part of the guide panel.

3. The display device of claim 1, further comprising a back cover coupled to a rear of the frame, wherein a first side of an end portion of the front sheet contacts the rear surface of the frame and a second side of the end portion of the front sheet contacts a portion of the back cover.

4. The display device of claim 3, wherein an outer surface of the outer part of the guide panel is formed with a curved surface which is covered by the front sheet.

5. The display device of claim 1, wherein the display panel comprises:
a front substrate;
a rear substrate; and
a front film disposed between the front substrate and the front sheet,
wherein:
an area of the rear substrate is greater than an area of the front substrate, such that a step is formed between the front substrate and the rear substrate; and
the area of the front substrate is greater than an area of the front film, such that a step is formed between the front film and the front substrate.

6. The display device of claim 5:
wherein the cable is coupled to the display panel adjacent to the step formed between the front substrate and the rear substrate,
wherein the display device further comprises a cable cover disposed opposite the rear substrate with respect to the cable,
wherein the cable cover comprises:
a first portion having an elongated shape with one side coupled to the rear substrate; and
a second portion curved from an edge of the first portion.

7. The display device of claim 6, further comprising a gap cover disposed between the cable cover and the front sheet,
wherein:
a thickness of the gap cover is substantially equal to a thickness of the front film; and
a combined thickness of the cable cover and the cable is substantially equal to a thickness of the front substrate.

8. The display device of claim 6, further comprising an adhesive layer disposed between the cable cover and the cable,
wherein:
a combined thickness of the cable and the adhesive layer is substantially equal to a thickness of the front substrate; and
a thickness of the cable cover is substantially equal to a thickness of the front film.

9. The display device of claim 5,
wherein the cable is coupled to the display panel adjacent to the step formed between the front substrate and the rear substrate;
wherein the display device further comprises:
a gap cover disposed between the front sheet and the cable; and
a buffer layer disposed between the cable and the gap cover,
wherein:
a combined thickness of the cable and the buffer layer is substantially equal to the thickness of the front substrate; and
the thickness of the gap cover is substantially equal to the thickness of the front film.

10. The display device of claim 9, wherein the gap cover and the buffer layer are made of a light-transmitting material.

11. A display device, comprising:
a display panel;
a frame disposed at a rear of the display panel;
a light source disposed between the display panel and the frame, and configured to provide light to the display panel;
a guide panel disposed adjacent to an edge of the display panel and coupled to the frame, and configured to support the display panel; and
a front sheet comprising a light transmitting portion covering a front surface of the display panel, and a light shielding portion extending from the light transmitting portion and covering the guide panel,
wherein the guide panel comprises:
an inner part disposed between the frame and the display panel and configured to support a rear surface of the display panel adjacent to the edge of the display panel; and
an outer part disposed toward an outer side of the frame and configured to cover a side surface of the edge of the display panel,
wherein the display device further comprises an end frame disposed adjacent to another edge of the display panel and corresponding edge of the front sheet.

12. The display device of claim 11, further comprising:
a cable coupled to the display panel; and
a source PCB coupled to a rear side of the frame,
wherein the cable passes between the frame and the end frame to connect the display panel to the source PCB.

13. The display device of claim 12, wherein the end frame further comprises a protrusion configured to secure the cable against the guide panel.

* * * * *